United States Patent
Höller et al.

(10) Patent No.: US 6,961,563 B2
(45) Date of Patent: Nov. 1, 2005

(54) OPTIMAL GATEWAY DISCOVERY WHILE ROAMING

(75) Inventors: Jan Höller, Stockholm (SE); Göran A. P. Eriksson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 639 days.

(21) Appl. No.: 09/969,588

(22) Filed: Oct. 4, 2001

(65) Prior Publication Data

US 2002/0058515 A1 May 16, 2002

Related U.S. Application Data

(60) Provisional application No. 60/247,058, filed on Nov. 13, 2000.

(51) Int. Cl.⁷ .................................. H04Q 7/20
(52) U.S. Cl. ................. 455/432.1; 455/435.2; 455/456.3; 370/401
(58) Field of Search .............................. 455/12.1, 13.2, 455/427, 428, 432.1, 432.2, 435.2, 440, 445, 456.3; 370/218, 351, 352, 331, 338, 401; 709/203, 220, 221, 227, 249; 379/221.01, 221.14, 900

(56) References Cited

U.S. PATENT DOCUMENTS

| | | | | |
|---|---|---|---|---|
| 5,561,836 A | * | 10/1996 | Sowles et al. | 455/428 |
| 5,953,664 A | * | 9/1999 | Sawyer et al. | 455/433 |
| 6,058,309 A | | 5/2000 | Huang et al. | |
| 6,067,442 A | * | 5/2000 | Wiedeman et al. | 455/13.1 |
| 6,157,636 A | * | 12/2000 | Voit et al. | 370/353 |
| 2002/0029275 A1 | * | 3/2002 | Selgas et al. | 709/227 |
| 2002/0058507 A1 | * | 5/2002 | Valentine et al. | 455/433 |
| 2002/0112003 A1 | * | 8/2002 | Glorikian | 709/203 |
| 2003/0208628 A1 | * | 11/2003 | Karjanlahti | 709/249 |

FOREIGN PATENT DOCUMENTS

WO 99/43165 8/1999

* cited by examiner

*Primary Examiner*—William Trost
*Assistant Examiner*—James D Ewart (57) ABSTRACT

A method of retrieving an address of a previously unknown resource based on the location of the invoking user by consulting a known resource is provided. A user terminal, while roaming, may select an optimal gateway for providing multimedia communications to the terminal by first sending a service request to the terminal's home gateway. In response, the home gateway determines the optimal gateway for use by the user based on the location of the invoking user. The address of the optimal gateway, as determined by the home gateway, is sent to the invoking user terminal, wherein the user sends a service request to the optimal gateway.

21 Claims, 6 Drawing Sheets

OPTIMAL GATEWAY DISCOVERY WHILE ROAMING

This application claims the benefit of Provisional Application No. 60/247,058, filed Nov. 13, 2000.

FIELD OF INVENTION

The present invention relates to the field of conversational multimedia communications in an IP environment and more specifically to the selection of a preferred gateway based on the location of the invoking party.

BACKGROUND

In existing communications models, the network centric approach is the dominant one. The network centric approach implies that services are provided by the network in a monolithic fashion, and he who owns the network owns the services. The implication is that the terminal or end user is restricted to the use of services offered by one or just a few operators. In addition these services are mainly offered on a subscription basis. The service offered to a user is typically a bundling of a set of supporting network services. The bundling is typically done in the switching systems (Local Exchanges, MSCs, etc.). There is little or no freedom to choose the best available service provider for these supporting network services on a call by call or session by session basis. For example, a phone service subscriber is more or less restricted to using the gatewaying services, transcoder services, and/or bridging devices for conferences provided by the phone service provider.

In a deregulated market, a multitude of service providers of all sorts of services are expected to be available on the market. This requires that the monolithic services of today be broken apart into their constituent parts and made available as separate services. Solutions to the basic problem of unbundling this services so that they may be easily accessible by anybody as well as provided by anybody have been proposed. For example, the publicly accessible stand alone gateway disclosed in European Patent Application Number 00850070.4, which is hereby incorporated herein by reference in its entirety.

A Gateway is a network node in a communications network, equipped for interfacing with another network that uses different protocols or different data formats. The gateways discussed herein interconnect higher layers than the link and network (IP) layer. The gateways support address mapping and can also provide transformation of the data between the networks to support end to end application connectivity such as conversion of file formats and the like. The networked support services provide by the gateways of interest are mainly those which actually process a media flow, and are typically: transcoder services (speech, audio, video); trans media services (e.g., text-to-speech); conference units and audio/video media mixers; security proxies (e.g., trusted security proxies for encryption/decryption); and other application layer gateways.

Figure 1:
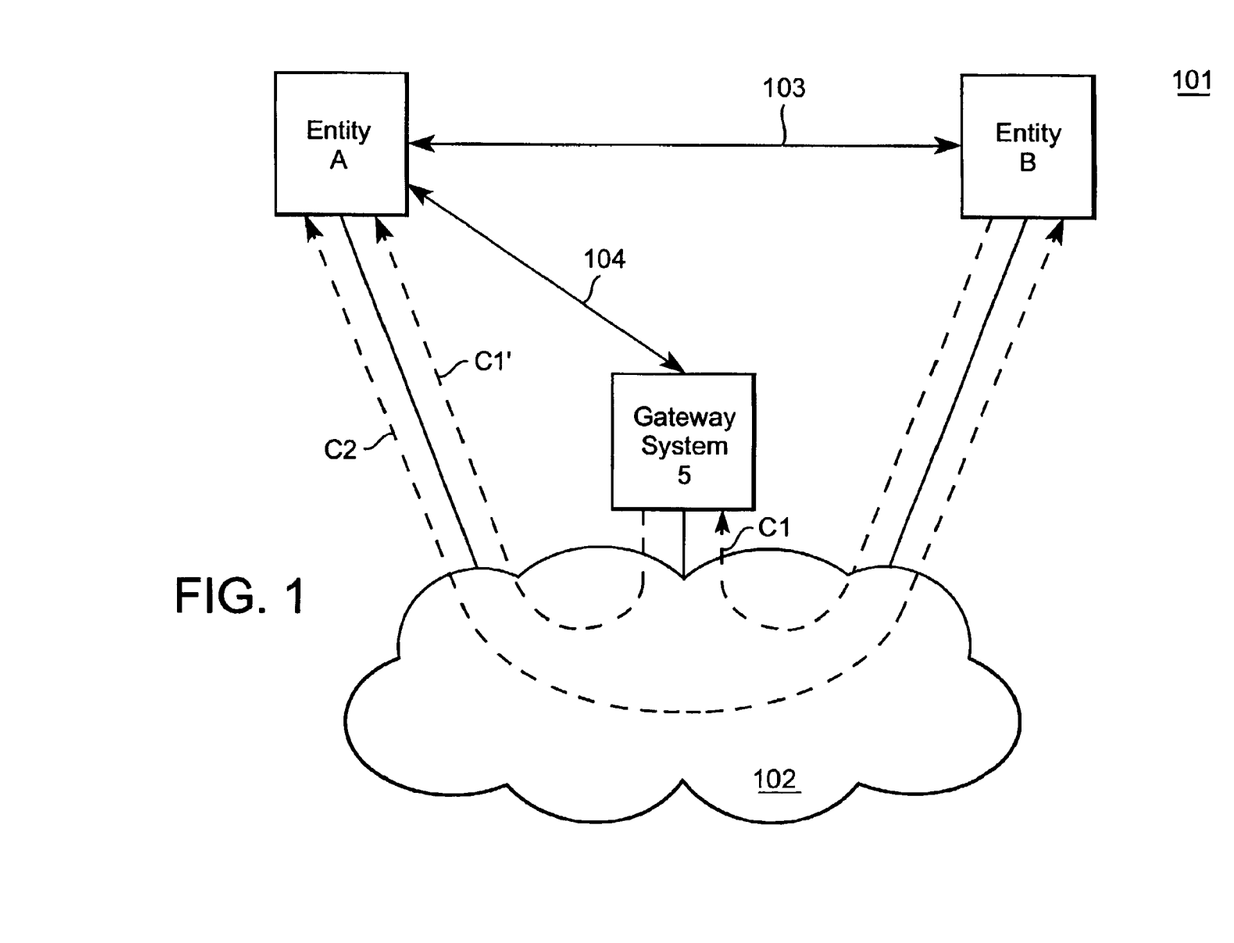
FIG. 1 shows a block diagram of a communications system which can be utilized by the invention.

FIG. 1 shows a communications system 101 that utilizes a publicly accessible stand alone gateway as disclosed in European Patent Application Number 00850070.4. The communications system 101 includes a first entity A, for example a mobile terminal, and a second entity B, for example an end system or end user serving terminals involved in the same session. Two media components, C1 and C2, for example, voice and video, are to be transferred from the second entity b, over an IP network 102 to the first entity A, within the communications system 101. The A to B session invitation and negotiation 103 may be done, for example, using standard Session Initiation Protocol/Session Description Protocol (SIP/SDP) procedures. SIP is an application layer protocol for creating, modifying and terminating sessions with one or more participants. These sessions include Internet multimedia conferences, Internet telephony calls and multimedia distribution. SDP is a protocol intended for describing multimedia sessions for the purpose of session announcements, session invitation, negotiation and other forms of multimedia session control. In this example the second entity B can only support MPEG2 video C1, whereas entity A is a mobile terminal that has a small screen and can only handle H.261 video. Accordingly, a transcoding service is required that transcodes MPEG2 to H.261 video. The communications system 101 also includes a gateway system S offering the service of processing a media stream C1 which in the example implies transcoding of MPEG2 to H.261 video.

Figure 2:
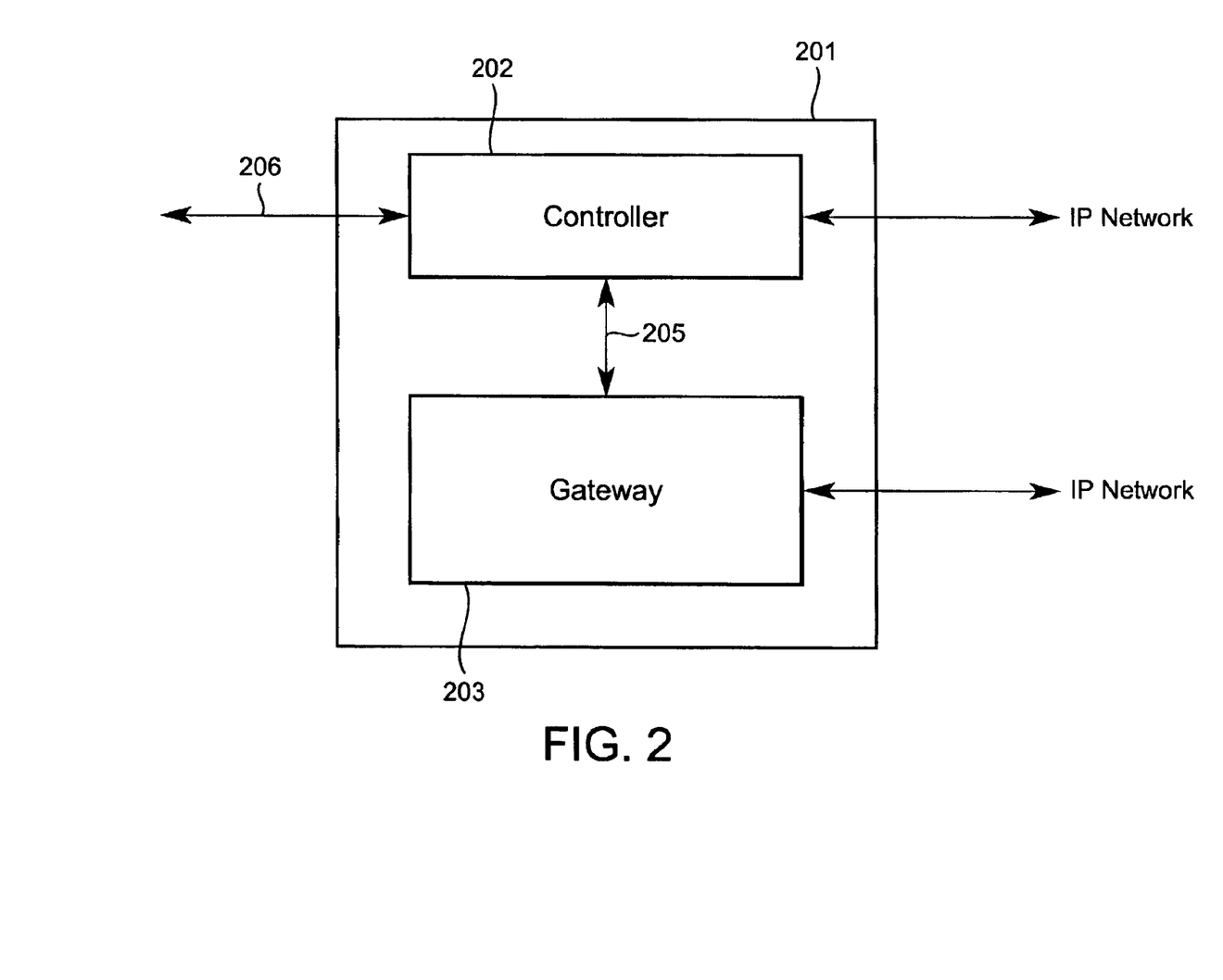
FIG. 2 shows a block diagram of a gateway system which can be utilized by the invention.

FIG. 2 shows a block diagram of a publicly accessible stand alone gateway which may be utilized by the invention. The gateway system 201 comprises a gateway controller 202 and a gateway 203 which are both connected to the IP network and each typically has an IP address. The gateway system 201 is available for external control through the gateway controller 202. The gateway controller 202 is publicly available via its published Universe Resource Identifier (URI) e.g., service@domain.

To access the Gateway and thus the services provided thereby, the first step is to configure the service. This is done with one or more service requests sent in a control protocol 206 from a first entity to the gateway controller. The control protocol may be based on SIP or SDP. It is also possible to send the service request in the same message exchange as the A to B session invitation. The gateway controller 202 is addressed using a URI in the form service@host (e.g., transcoder@services.operator.com) in the request. In the case where a SIP or SDP control protocol is employed, the URI would be used in the SIP Uniform Resource Locator (URL) according to known practice in the format sip:service@host. The service request typically contains information about type of service, e.g., transcoding from MPEP2 to H.261 and information about the address to which the stream should be sent, e.g., IP address and port number of first entity A and other necessary address information pertaining to the entities A and B and the associated media stream.

Accordingly, if for a specific call a user wishes to use a service provided by a gateway system, the gateway system is addressed for the purpose of configuration and activations, by means of the gateway's URI. This requires that the user know the URI of the gateway. The user configures the service for the specific call and activates the service.

However, a problem arises when the user is not within his home network, i.e., when the user is roaming. This results from the fact that the user typically, only knows the URI of the one or few gateways which provide a service in the users home network. Therefore, the user has a limited set of gateways to select from. This means that while roaming, there is no real means to select an "optimal" or preferred gateway, and problems such a tromboning the media stream to the "home" service provider's gateway while visiting another network occurs.

Therefore, a need exists for an automatic mechanism for providing a user with a preferred gateway on a call by call or session by session basis.

SUMMARY OF THE INVENTION

As a solution to the above-described problem, the invention, according to exemplary embodiments, provides techniques for acquiring the URI of a preferred gateway on a call by call or session by session basis.

This is achieved by the user's home gateway providing a preferred gateway's URI to the user when the user is not located within the home network. Accordingly, the user invokes the desired service via the user's home gateway. The home gateway, then determines the preferred gateway for use by the invoking user and provides the URI of the preferred gateway to the user via a response. The user then invokes the preferred gateway using the URI provided by the home gateway.

It shall be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The objects and advantages of the invention will be understood by reading the detailed description in conjunction with the drawings, in which.

DETAILED DESCRIPTION OF THE INVENTION

The various features of the invention will now be described with respect to the figures, in which like parts are identified with the same reference characters.

In the following description, for purposes of explanation and not limitation, specific details are set forth, such as particular steps, algorithms, techniques, circuits and the like, in order to provide a thorough understanding of the invention. However, it will be apparent to one of ordinary skill in the art that the invention may be practiced in other embodiments that depart from these specific details. In other instances, detailed descriptions of well-known methods, devices, and circuits are omitted so as not to obscure the description of the invention with unnecessary detail.

These and other aspects of the invention will now be described in greater detail in connection with a number of exemplary embodiments. To facilitate an understanding of the invention, many aspects of the invention are described in terms of sequences of actions to be performed by elements of a computer system or apparatus. It will be recognized that in each of the embodiments, the various actions could be performed by specialized circuits, by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention.

The home gateway is the gateway service that the user usually consults. The user may have a subscription to the service from a service provider having a Fully Qualified Domain Name (FQDN), for example home.gatewayprovider.com. The FQDN is used to invoke the services of the gateway. However, when the user travels into a visited network, the user only has information about how to make use of the home gateway connected to the home network.

Figure 3:
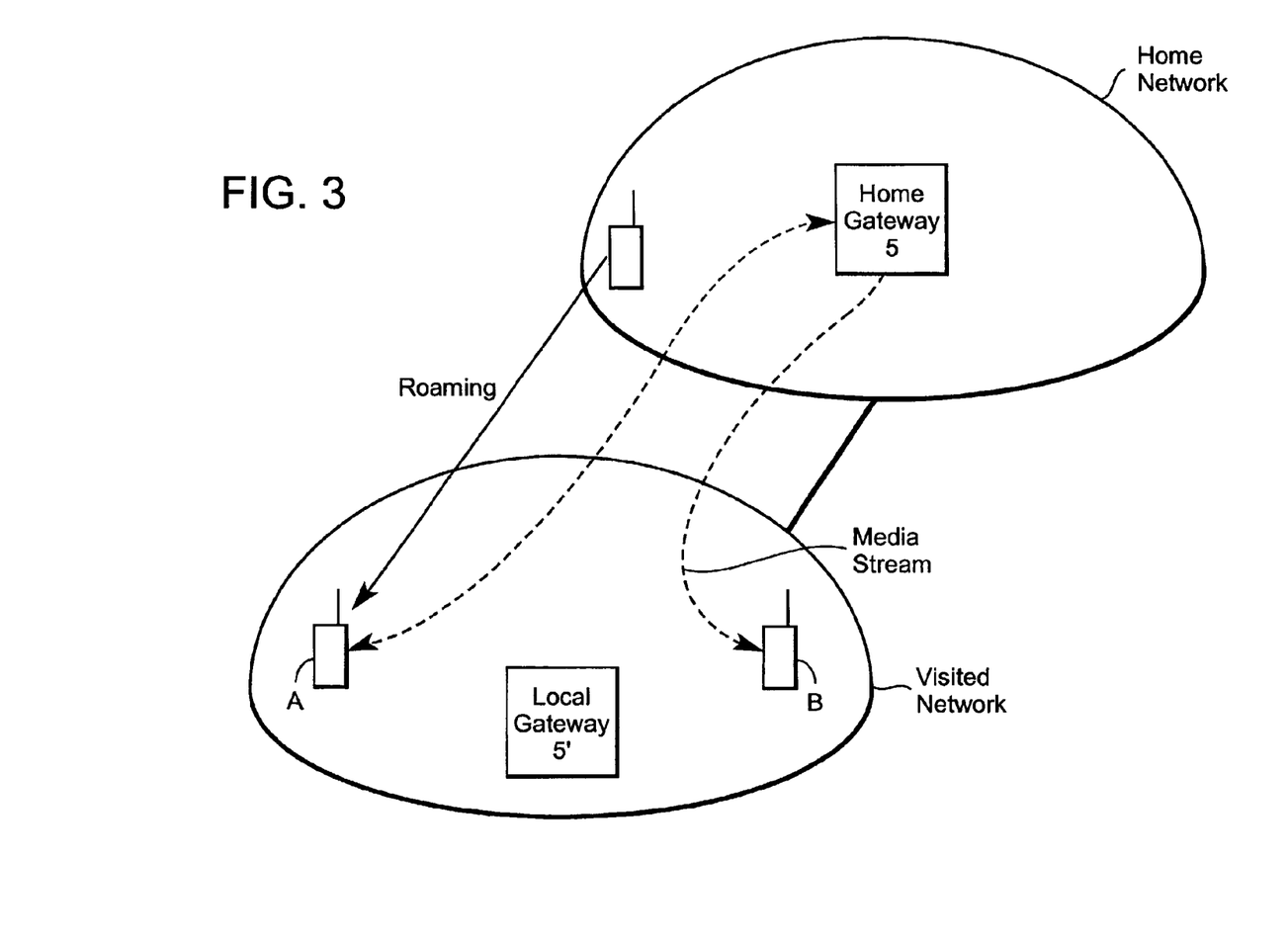
FIG. 3 shows the use of a gateway service while roaming according to known methods.
Figure 4:
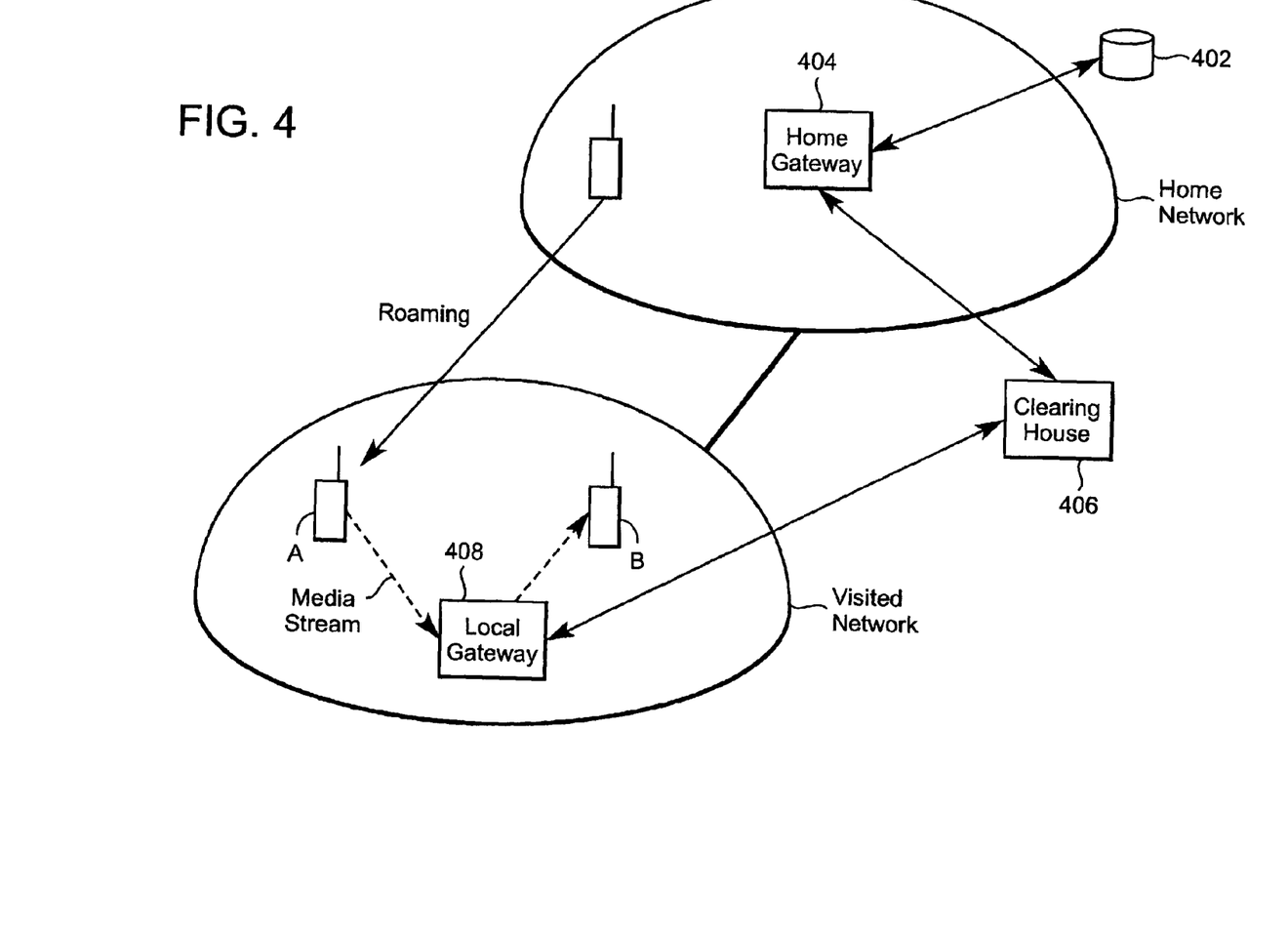
FIG. 4 shows the use of a gateway service while roaming according to an exemplary embodiment of the invention.

According to an embodiment of the invention the location of an optimal or preferred gateway is determined based on where the invoking user is located. This is exemplified in the FIG. 3, wherein the roaming user A wishes to invoke the services of a gateway in a multimedia conference with user B, preferrably using the local gateway 408. In order to achieve this, user A needs to know the URI associated with the local gateway 408.

Figure 5:
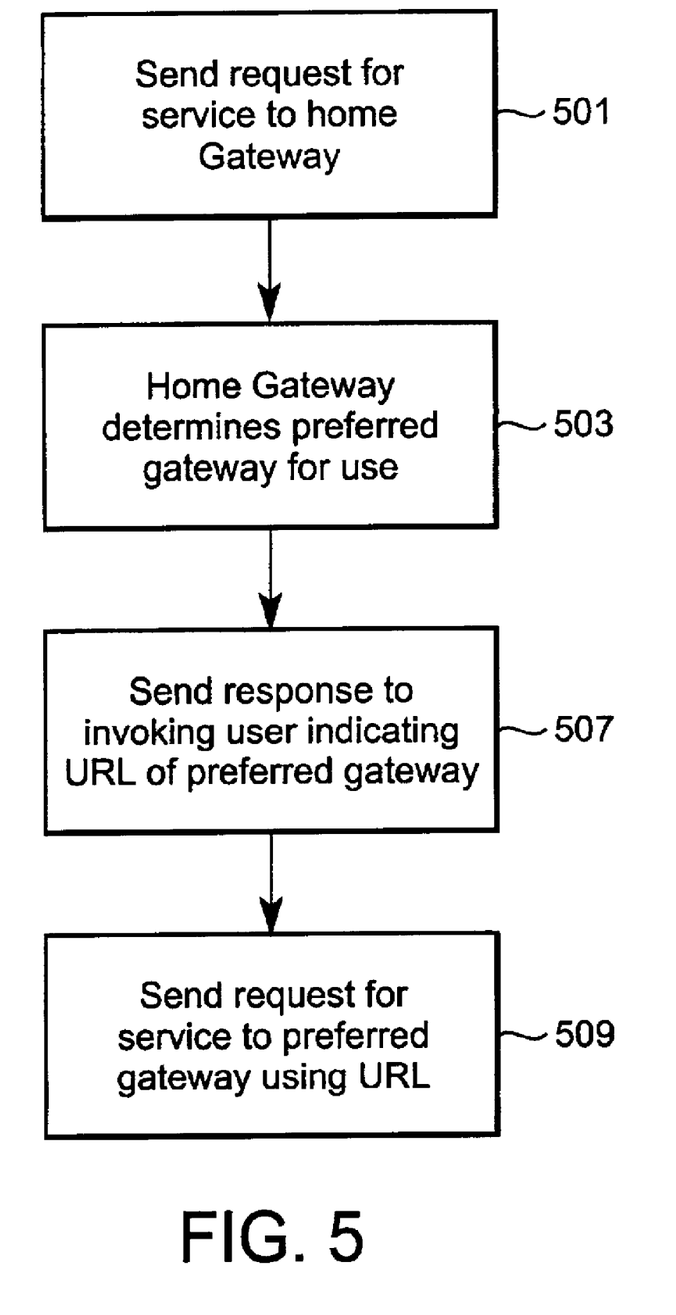
FIG. 5 shows a flowchart of a method according to an embodiment of the invention.

Therefore, according to an exemplary embodiment of the invention, an INVITE is sent from user terminal A to invoke the desired service in the home gateway 404, as shown in step 501 of FIG. 5. The INVITE request contains information about who is invoking the service, for example, the invoking/calling party in the From-header, and may contain data providing information on the invoking user's location. The user location information can be provided in various forms. For example, the location information can be one or more of the following. An IP-address, which usually provides information about a geographical location to some extent. A Contact address containing information about the visited network, for example, jan.holler@visitor1234.quebec.cantel.ca. This may be assigned when the user jan.holler@telis.se is logging on the terminal and attaching to the visited network while visiting in Canada. Finally, the location information can other geographical information retrieved for example, via a global position system (GPS) or cellular network location information.

In step 503, the gateway, based on the location information provided or derived from the INVITE, determines the preferred gateway for use by the invoking user. The URI of the preferred or local gateway is then provided to the invoking party in a response to the INVITE in step 507.

If information about the invoking party's location is not provided in, or can not be deduced by the information in the INVITE, the gateway may send an inquiry to a location database requesting the necessary information. This location database is typically updated by the invoking party using standard SIP procedures. The invoking party has previously, perhaps at terminal power-on, updated his present location using the REGISTER request which contains a Contact-header providing information about the present location or point of contact for the user.

The response sent by the home gateway can be a standard SIP response with a status code of 3xx. Alternatively, the home gateway may use an existing or new status code, for example the status code 302 "Moved Temporarily" or 308 "alternative service". In either case, the response contains the URI of the preferred or local gateway to be used in the Contact-header, for example, service@bestgateway.net. Optionally, credentials for using the services of the local other gateway (which may be owned by a completely different service provider), can be supplied.

In step 509, a new INVITE is sent to the local or preferred gateway using the URI received from the home gateway to invoke the services of the local gateway. The rest of the message flow follows standard procedures.

If the home gateway does not have knowledge of which gateway is closest to the user, it may consult, for example, a gateway database to look up the information, or it may rely on a clearinghouse to provide the necessary information about the best positioned gateway, referred to as the local gateway. In addition, credentials for the usage of a gateway in a visited network may also be retrieved.

Figure 6:
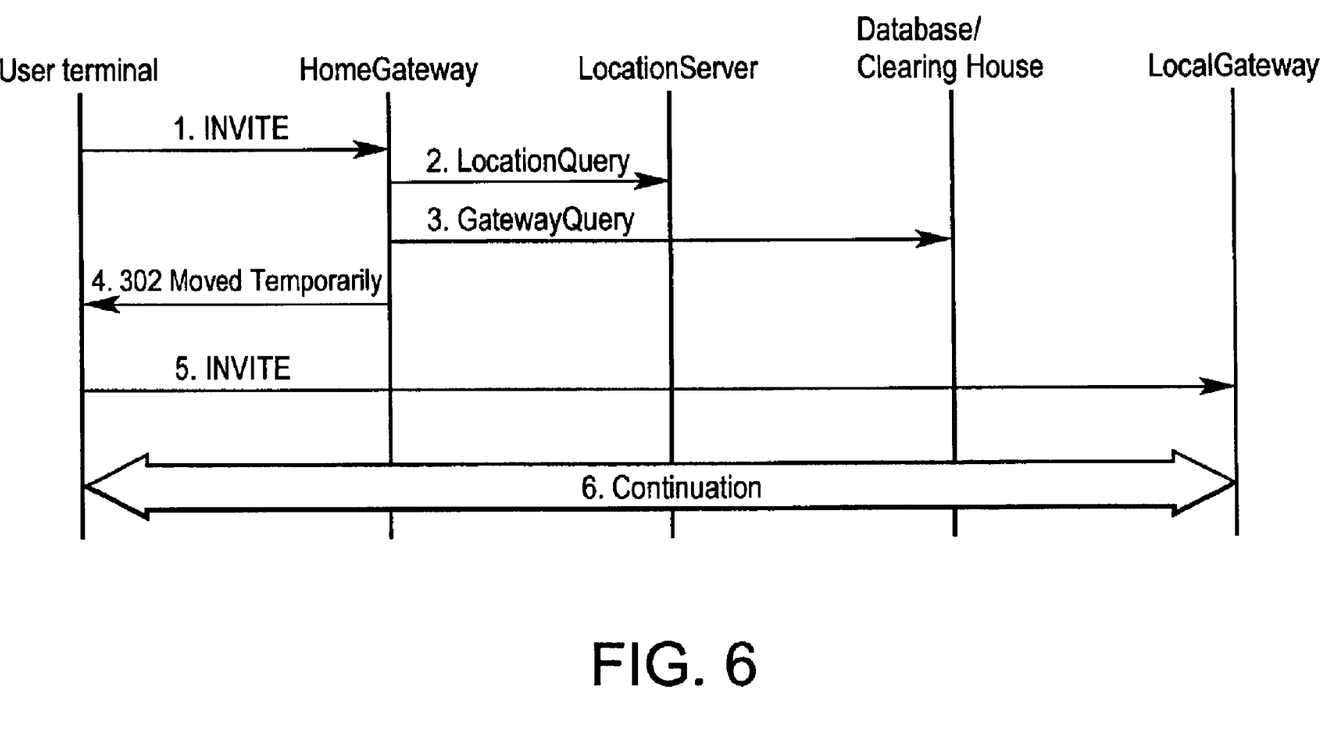
FIG. 6 shows a call flow according to an exemplary embodiment of the invention.

A typical call flow according to an exemplary embodiment of the invention is shown in the FIG. 6. The call flow shown is based on using the SIP protocol to control the services of the gateway as described in the above mentioned European Patent Application No. 00850070.4 and the Internet Engineering Task Force's Internet Draft entitled, "Third Party Call Control with SDP Preconditions" by Gonzalo Camarillo. However, the present invention is not limited to using only the SIP protocol. As shown in FIG. 6, the user terminal invokes a service from the home gateway using an INVITE message 1. The home gateway then determines the invoking terminals location 2 and the preferred gateway 3. A response 4 is sent to the invoking party using for example, the status code 302 "Moved Temporarily". The user terminal then invokes the service in the local gateway using an INVITE message 5.

The present invention provides several advantages. For example, tromboning is avoided thus ensuring an optimal quality of service, better network resource utilization, and is a complement to the stand-alone gateway service to support mobile users.

The invention has been described with reference to particular embodiments. However, it will be readily apparent to those skilled in the art that it is possible to embody the invention in specific forms other than those of the preferred embodiments described above. This may be done without departing from the spirit of the invention.

For example, if a gateway is to be used in a two party session, which is not a prerequisite for the invention, the far end party location might also be of interest in determining the preferred gateway for use during the session. For example, the home gateway could use the location information of both parties to determine the location of the optimal gateway for use by the parties. The location information of the called party may however not always be available or retrievable.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of locating a preferred gateway for use by an invoking party within a multimedia Internet Protocol (IP) based communication system wherein said invoking party is associated with a home network with a home gateway, the method comprising:
sending, by the invoking party, a service request requesting a particular service to the invoking party's home gateway wherein said invoking party is roaming within a visited network and not located within said home network;
determining, by the home gateway, a preferred gateway outside of said home network for use by the invoking party wherein said determined preferred gateway is capable of providing the requested service to the roaming invoking party;
sending, by the home gateway, a response to the invoking party indicating the preferred gateway; and
resending, by the invoking party, a second service request requesting said particular service to the preferred gateway.

2. The method of claim 1, wherein determining the preferred gateway for use by the invoking party is based on predefined preferences.

3. The method of claim 1, wherein determining the preferred gateway for use by the invoking party is based on the location of the invoking party.

4. The method of claim 3, wherein the service request sent to the invoking party's home gateway comprises information regarding the invoking party's location.

5. The method of claim 3, wherein the location of the invoking party is retrieved by the home gateway from a location database.

6. The method of claim 1, wherein determining the preferred gateway for use by the invoking party is based on the location of the invoking party and the location of the called party or parties.

7. The method of claim 1, wherein determining the preferred gateway for use by the invoking party further comprises: retrieving, from a gateway database, information indicating the preferred gateway.

8. The method of claim 1, wherein determining the preferred gateway for use by the invoking party further comprises: requesting information indicating the preferred gateway from a clearinghouse.

9. A method of invoking a service gateway by an invoking party within a multimedia Internet Protocol (IP) based communication system, wherein said invoking party is associated with a home network including a home gateway and currently roaming within a visited network, the method comprising the steps of:
sending, by the invoking party, a service request for a particular service to the invoking party's home gateway while traveling outside of said home network;
determining, by the home gateway, a preferred gateway for use by the invoking party for providing said requested service within said visited network;
sending, by the home gateway, a response to the invoking party indicating the preferred gateway; and
sending, by the invoking party, a second service request for said service to the preferred gateway.

10. The method of claim 9, wherein determining the preferred gateway for use by the invoking party is based on predefined preferences.

11. The method of claim 9, wherein determining the preferred gateway for use by the invoking party is based on the location of the invoking party.

12. The method of claim 9, wherein determining the preferred gateway for use by the invoking party further comprises: retrieving, from a gateway database, information indicating the preferred gateway.

13. The method of claim 9, wherein determining the preferred gateway for use by the invoking party further comprises: requesting information indicating the preferred gateway from a clearinghouse.

14. A home gateway within a multimedia Internet Protocol (IP) based communication network, wherein said home gateway is associated with a home network serving a particular invoking party wherein said invoking party is currently roaming outside of said home network and traveling within a visited network, comprising:
means for receiving a first service request from said invoking party roaming within said visited network, said first service request requesting a particular service;

means for determining the location of said roaming invoking party requesting said application service;

means for determining a preferred gateway for providing said requested service based on said determined location;

means for sending a reply message to said invoking party identifying said determined preferred gateway thereby allowing said invoking party to resend a second service request to said preferred gateway for requesting said service.

15. The home gateway of claim 14 wherein said means for determining the preferred gateway for providing Said service is based on predefined preferences.

16. The home gateway of claim 14 wherein said received first service request includes information regarding the invoking party's location.

17. The home gateway of claim 14 wherein said means for determining the location retrieves information regarding the location of said roaming invoking party from a location database.

18. The home gateway of claim 14 wherein said means for determining the preferred gateway is based on the location of the invoking party and the location of a called party or parties.

19. The home gateway of claim 14 wherein said service includes a multimedia conference cell.

20. The home gateway of claim 14 wherein said first service request comprises a Session Initiation Protocol (SIP) based signal.

21. The home gateway of claim 20 wherein said SIP based signal comprises an INVITE signal.

* * * * *

UNITED STATES PATENT AND TRADEMARK OFFICE
CERTIFICATE OF CORRECTION

| | |
|---|---|
| PATENT NO. | : 6,961,563 B2 |
| APPLICATION NO. | : 09/969588 |
| DATED | : November 1, 2005 |
| INVENTOR(S) | : Jan Holler et al. |

It is certified that error appears in the above-identified patent and that said Letters Patent is hereby corrected as shown below:

In Column 8, Line 10, in Claim 19, delete "cell" and insert -- call --, therefor.

Signed and Sealed this

Twenty-seventh Day of November, 2007

JON W. DUDAS
*Director of the United States Patent and Trademark Office*